United States Patent [19]

Cabaret et al.

[11] 4,289,005

[45] Sep. 15, 1981

[54] PROCESS AND DEVICE FOR CONTROLLING THE FLATNESS OF A COLD-ROLLED METAL SHEET

[75] Inventors: Pierre M. Cabaret, Paris; Maurice B. Daboust, Mont Louis sur Loire; Pierre R. Engerran, Creil, all of France

[73] Assignee: Union Sidérurgique du Nord et de l'est de la France (USINOR), Paris, France

[21] Appl. No.: 28,917

[22] Filed: Apr. 10, 1979

[30] Foreign Application Priority Data

Apr. 13, 1978 [FR] France .............................. 78 10906

[51] Int. Cl.³ ............................................ B21B 37/04
[52] U.S. Cl. ............................................ 72/12; 72/17; 72/20; 73/159
[58] Field of Search ..................... 72/17, 6, 7, 8, 9, 10, 72/11, 12, 201, 20

[56] References Cited

U.S. PATENT DOCUMENTS

| 3,475,935 | 11/1969 | Kajiwara | 72/9 |
| 3,496,744 | 2/1970 | Mizuno et al. | 72/12 |
| 3,499,306 | 3/1970 | Pearson | 72/17 |
| 3,802,237 | 4/1974 | Albensi et al. | 72/17 |
| 4,074,624 | 2/1978 | Brornstad | 72/20 |
| 4,188,809 | 2/1980 | Ishimoto et al. | 72/17 |

Primary Examiner—Milton S. Mehr
Attorney, Agent, or Firm—Cushman, Darby & Cushman

[57] ABSTRACT

A process for controlling the flatness of a metal sheet subjected to a cold-rolling operation by the measurement of the tensions in different regions of the width of the sheet. There are at least three regions. The process comprises calculating the sum of the tensions measured in the respective regions, calculating from the result obtained the theoretical tension in each region corresponding to a tension uniformly distributed along the width of the sheet, comparing said theoretical tension with the tension effectively measured in the corresponding region and exerting, if required, the required correcting actions as a function of the results of said comparison.

23 Claims, 13 Drawing Figures

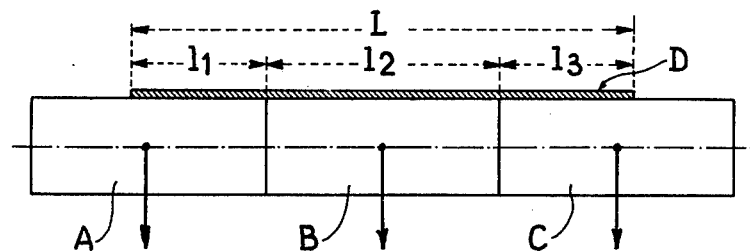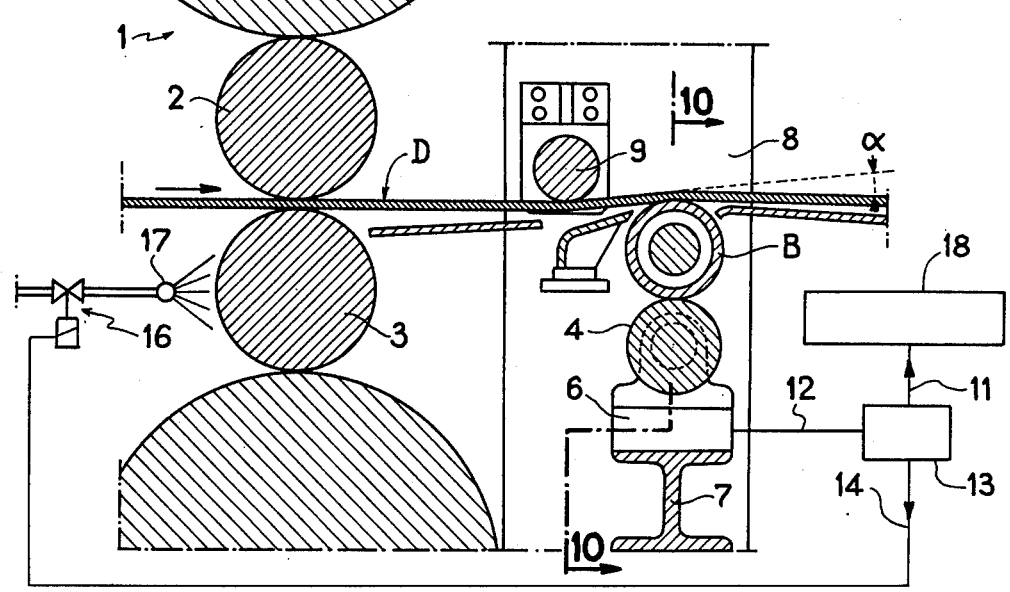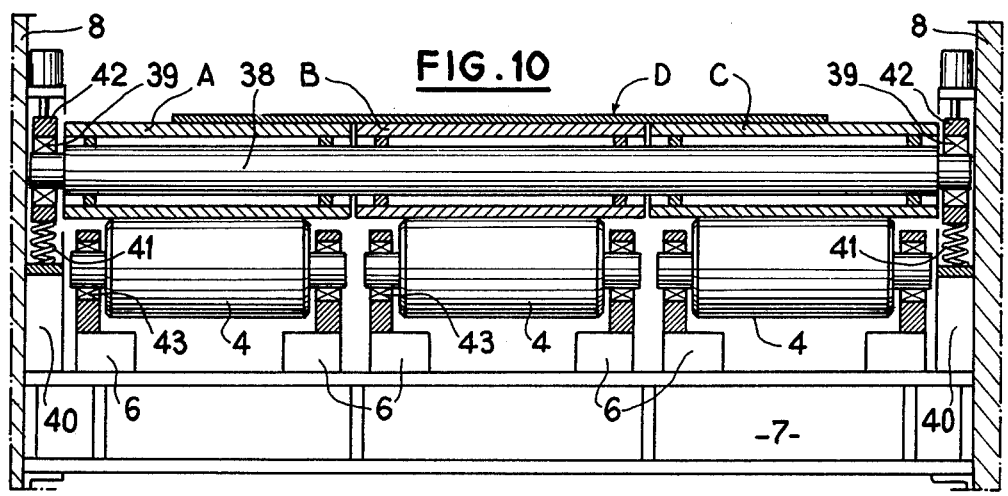

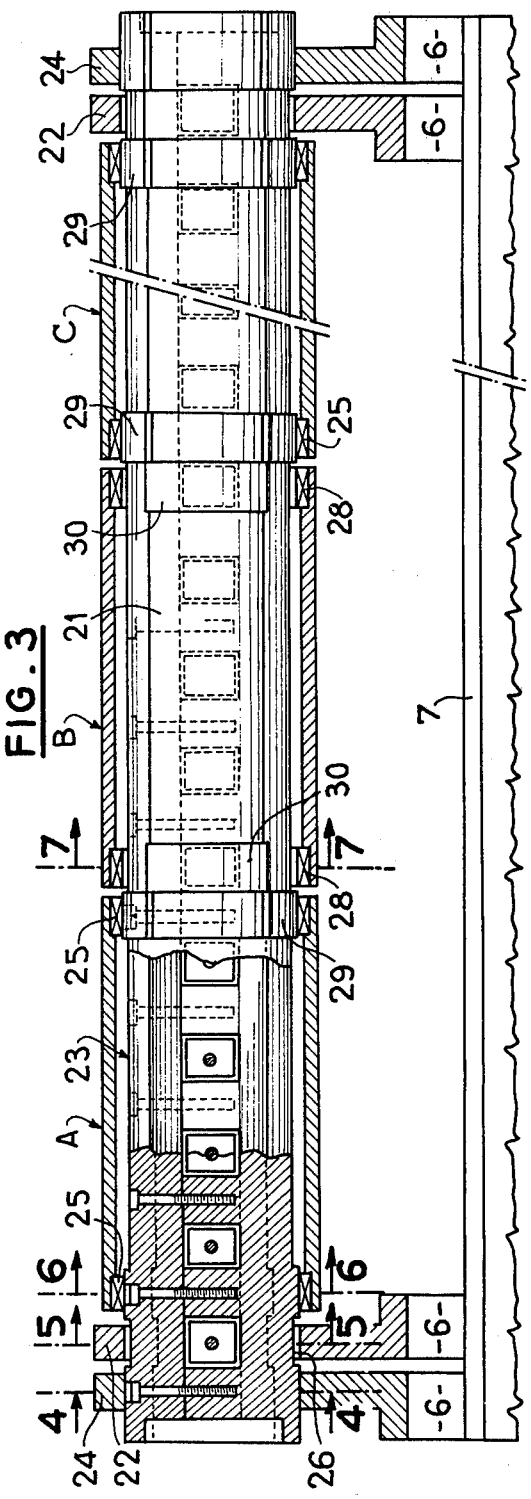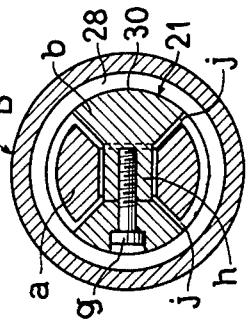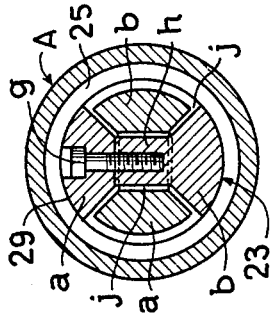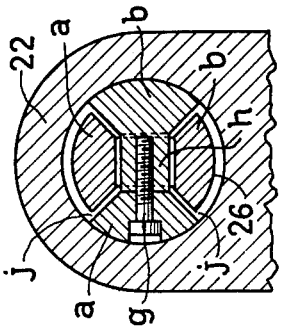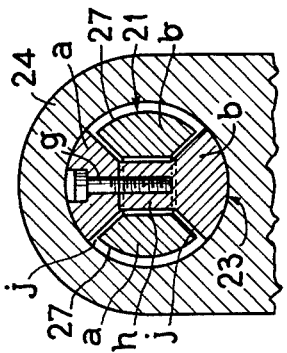

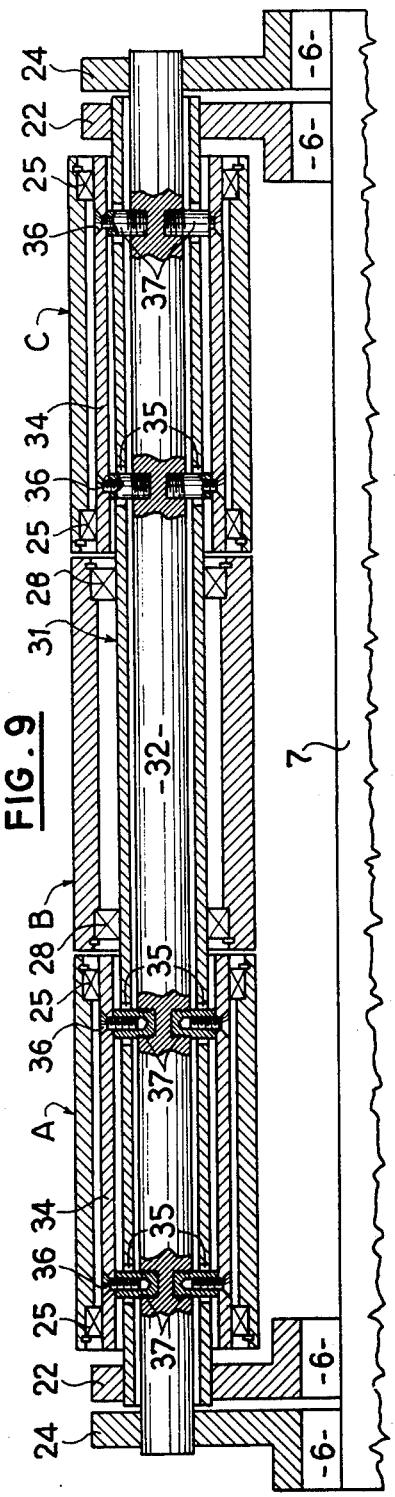
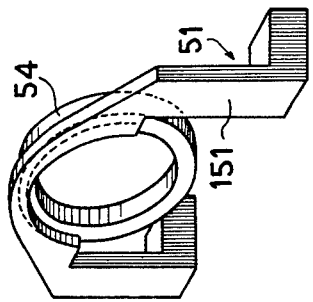
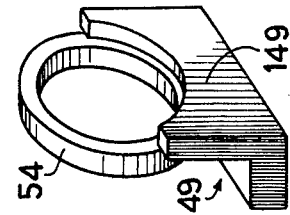
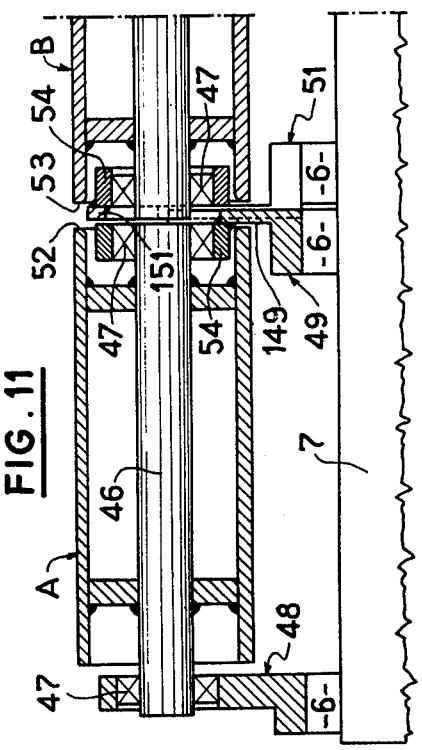

PROCESS AND DEVICE FOR CONTROLLING THE FLATNESS OF A COLD-ROLLED METAL SHEET

DESCRIPTION

In the course of the continuous cold-rolling of a metal sheet, the metal is subjected to tensile forces which vary in accordance with the nature of the metal and the desired reduction in the thickness.

If there are differences in the tension in the width of the sheet in the course of the rolling, and if these reach high values, defects appear in the flatness of the sheet under tension and the operator then acts on the various means at his disposal for remedying these defects, for example by modifying the crown or curvature of the rolls of the mill or by acting on the pressure-applying means or by achieving a deformation of the rolls hydraulically or by a local modification of the diameter of the rolls obtained essentially by a spraying thereof in precise regions so that a shrinkage of these regions is achieved by the cooling effect.

It is preferable to foresee these defects so as to react before they appear. This is why it has already been proposed to detect the differences in tension which might exist in a section of the sheet before they assume such value that the defect becomes visible on the sheet under tension. This provides the additional advantage of enabling the operator to achieve a good guiding of the sheet in the mill since the sheet has a tendency to shift laterally if the edge portions lack tension or if this tension is unequally distributed.

U.S. Pat. No. 3,475,935 to KAJIWARA teaches controlling the flatness of which is based, on one hand, on the measurement of the force exerted by the sheet on at least two coaxial rollers, this measurement providing the intensity of the forces applied to each of the rollers, on the other hand, on the measurement of the torque exerted by the strip on each of the rollers, this measurement revealing, by dividing the torque by the intensity of the force exerted on the same roller, the distance between the resultant and the considered axis of rotation. Knowing the width of the sheet inscribed on each roller, the thus calculated distance permits locating the resultant of the forces applied on each roller with respect to the middle of the sheet portion which is inscribed on the same roller. This process requires complicated calculations. Moreover, it pre-supposes that the sheet is perfectly centered on the axis of the mill or that means are available for measuring the effective width of the sheet which bears on each of the end rollers so as to know the exact position of the middle of this sheet portion.

An object of the invention is to avoid these difficulties. According to the invention, there is provided a process for controlling the flatness of a metal sheet subjected to a cold-rolling operation, by the measurement of the tensions in different regions of the width of the sheet, said regions being at least three in number, comprising calculating the sum of the tensions measured in the respective regions, calculating from the result obtained the theoretical tension in each region corresponding to a tension uniformly distributed along the width of the sheet, comparing said theoretical tension with the tension effectively measured in the corresponding region and exerting, if required, the required correcting actions as a function of the results of said comparison.

The process according to the invention consequently only requires the measurement of the intensity of the forces applied on each of the rollers and renders the measurement of the resulting torque unnecessary. Further, by means of a simple calculation, it determines the theoretical force exerted on the roller on the assumption of a uniformly distributed tension over the width of the sheet. The comparison with the effectively measured force permits, with no other calculation, determining whether the sheet portion which bears on each roller is subjected to a suitable tension, an excessive tension or an excessively weak tension. If the sheet is correctly centered, this comparison gives a correct indication for each of the end rollers considered separately.

If the sheet is off centre, it is possible, with no need to measure separately the width of the sheet portions which bear on the end rollers, to compare in an overall way the sum of the forces measured on the two end rollers with the theoretical calculated value and to deduce therefrom whether the sheet is effectively "longer" in the centre than on the edge portions or inversely. Experience shows that in a balanced cold-rolling mill there is a quasi symmetry in the distribution of the tensions along the width of the sheet and that consequently the aforementioned indication is quite sufficient.

In carrying out the process, the tensions are measured in at least three different regions of the width of the sheet by means of a corresponding number of coaxial thrust rollers and force sensors known per se, said rollers being, according to the invention, in adjoining relation or substantially adjoining relation so that sum of the forces measured by the respective rollers is substantially representative of the total tension exerted on the sheet.

The values revealed by the sensors, which are for example six in number, after having been translated in a suitable manner, are processed by a computer which compares these values with the theoretical values and, in the case of a deviation, either merely displays indications enabling the operator to proceed to the required corrections or produces an error signal for a suitable automatic correcting device.

As the number of rollers is three, in order to reduce the number of sensors to four and thereby permit an assembly which, from the point of view of mechanical construction and exploitation of the data, is particularly simple, the invention proposes an arrangement in which the centre roller is journalled on a shaft element which extends through the lateral rollers and whose respective end portions are, beyond the lateral rollers, mounted in two supports each of which bears through a force sensor on a girder which is rigid with the frame of the mill. The lateral rollers are then carried by a shaft element on which they are freely rotatable and which extends through the supports of the centre roller and whose respective end portions, beyond the supports of the centre roller, are mounted in two supports each which bears through a force sensor on the girder.

Each shaft element may be formed by two diametrally opposed 90° sectors, the two shaft elements being disposed in the form of a cross with respect to each other, so as to ensure the independence of the two elements. It is also possible to construct one of the shaft elements in a tubular shape and construct the other in the form of a solid bar which coaxially extends throughout the tubular element and is rendered rigid with a tubular sleeve which is concentric with and outside the tubular element so as to rotatably support the centre roller, or with the tubular sleeves so as to rotatably support the edge rollers.

Assuming again that there are three thrust rollers and with the use of six force sensors either of the following arrangements according to the invention may also be adopted :

a single shaft carrying the three thrust rollers and journalled in two bearings which are floatably mounted in the vertical direction on the support girder, and three support rollers and disposed in contact with the respective thrust rollers and each journalled in two bearings each of which bears through a force sensor on the support girder;

for each of the rollers, an independent shaft which is journalled in two bearings each of which bears through a force sensor on the support girder.

The invention will be described in the ensuing description with reference to the accompanying drawings in which:

FIG. 1 is a cross-sectional view diagrammatically illustrating the manner of measurement the differences of tension in the width of the sheet, on which the invention is based;

FIG. 2 is a longitudinal sectional view of a part of a rolling mill comprising a device according to the invention;

FIG. 3 is a cross-sectional view of one embodiment of the device comprising two shaft elements which are partly assembled in the form of a cross and two pairs of force sensors;

FIGS. 4, 5, 6 and 7 are sectional views taken on lines 4—4, 5—5, 6—6, 7—7 of FIG. 3;

FIG. 9 is a cross-sectional view of an embodiment of the device comprising two shaft elements, one of which is tubular and the other is a bar extending through the tubular element;

FIG. 10 is a view of an embodiment of the device with a single shaft corresponding to a section on the line 10—10 of FIG. 2;

FIG. 11 is a partial cross-sectional view of an embodiment of the device comprising three independent shafts for the respective rollers, and FIGS. 12 and 13 are perspective views of the construction of two adjacent bearings each supporting the end portion of a roller shaft.

Figure 8:
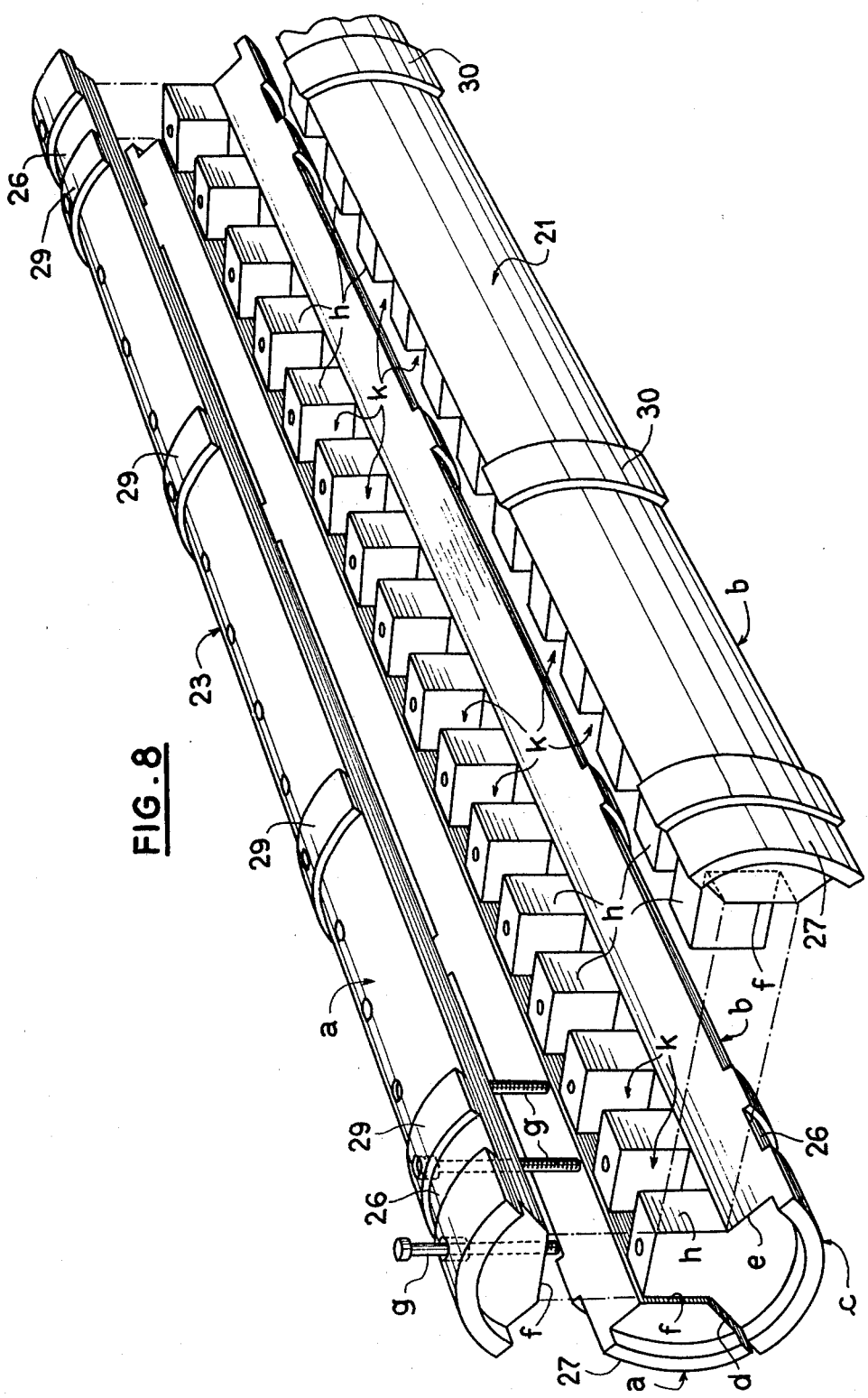
FIG. 8 is a perspective detail view of the assembly of the two shaft elements.

In the diagram of FIG. 1, three rollers A, B and C are shown around which a strip of band D of width L extends this band being subjected to a cold-rolling operation. The length $l_2$ of the centre roller B is so calculated that it is always entirely covered by the narrowest strip which may be treated in the rolling mill. At a given instant, the strip of the real width L extends to the extent $l_1$ on the roller A and the extent $l_3$ on the roller C.

The tension exerted on the strip owing to the fact that the latter has with the rollers a contact which is more than tangential, applies a vertical force on each of the rollers. If the tension is uniformly distributed throughout the width of the strip, the force applied to each roller is proportional to the width of the strip supported thereby. Thus it is easy to calculate from the measurement of the sum of the forces exerted on the three rollers the ideal or theoretical distribution which corresponds to a tension which is uniformly distributed in the sheet.

In practice, since there is a proportionally between the measured force and the tension which produces this force, the measuring devices may be directly graduated in units of tension and the theoretical tensions are calculated by means of the following formulae:

$$T_A = \frac{\text{Total tension} \times l_1}{L}$$

$$T_B = \frac{\text{total tension} \times l_2}{L}$$

$$T_C = \frac{\text{total tension} \times l_3}{L}$$

in which the total tension is the sum $T'_A + T'_B + T'_C$ of the real tensions corresponding to the forces detected under the respective rollers.

If, for example:

$$T'_A < T_A$$

$$T'_B > T_B$$

$$T'_C < T_C$$

it can be immediately concluded that the real tension at A and C is too low and that the edge portions are "long", and that, on the other hand, the tension at B is excessively high and that the centre region is "short".

FIG. 2 shows in longitudinal section a part of the cold-rolling mill comprising a train of rolls 1 having two rolls 2, 3 between which the sheet D passes, this sheet passing through a control device according to the invention after the train 1. This device comprises three thrust rollers each of which exerts, as shown for the centre roller B, and through a support roller 4, a roughly vertical thrust or force on a force sensor 6 carried by a transverse girder 7 which is rigid with the columns 8 of the rolling mill.

The roughly vertical force exerted by the roller B on the support roller 4 is due to the fact that the sheet D is in bearing relation, between the columns 8, with an auxiliary roller 9 and that the rollers A, B, C have an upper generatrix which is above the tangent plane common to the roll 2 and the roller 9, so that the sheet D extends round the rollers A, B, C on an arc of the circumference having a certain angular extent $\alpha$.

The measurements effected by the force sensors 6 can be used in accordance with various arrangements, for example as shown diagrammatically, by means of a conductor 12 which transmits electric signals produced by the sensor 6 and applied to a computer 13 which has an output 11 supplying current to a display device 18 and an output conductor 14 which is connected to an electrically operated valve 16 which controls two spraying systems for spraying a liquid onto the periphery of the rolls 2, 3 of the train 1 so as to locally reduce the diameter of the rolls and thereby correct possible differences detected between the tensions measured by the sensor 6 and the theoretical tension calculated by the apparatus 13. Only the spraying system 17 associated with the lower roll 3 has been shown.

In the embodiment shown in FIG. 3, the centre roller 3 is supported by a shaft element 21 which extends through the edge rollers A and C and bears by the end portion thereof on two supports 22 each of which bears on the girder 7 through a force sensor 6. The edge rollers A and C are carried by a shaft element 23 which is independent of the shaft element 21 and has respective end portions which, after having extended through the corresponding supports 22, bears on two supports 24 each of which bears through a sensor 6 on the girder 7. The shaft element 21 and the shaft element 23 each comprise two cylindroprismatic members a and b whose cross-sectional shape is approximately an isosceles trapezium the large base c of which is circular and whose sides d and e adjacent to said large base make an angle of 90° therebetween, said two members being assembled by screws g which radially extend through one of the members a and are screwed into blocks h which are spaced apart along the axis of the element and which extend the other member b adjacent the small base f of its trapezium cross-sectional shape and are applied against the face of the member a corresponding to the small base f of its trapezium cross-sectional shape. Inside the rollers A, B, C, the two shaft elements 21, 23 are arranged in a cross configuration relative to each other, the blocks h of one of the shaft elements extending through gaps k between the blocks h of the other shaft element. The two shaft elements 21, 23 are moreover spaced apart circumferentially and radially and define clearances j (FIGS. 4 to 7).

In the region of each support 22 or 24 receiving the end portion of a shaft element 21 or 23, the end portion of the other shaft element comprises a peripheral groove 26 or 27 which affords an independent bearing portion for the respective shaft elements.

As can be seen in particular in FIGS. 6 and 7, each roller A, B or C is journalled on the shaft element associated therewith by means of ball bearings 25 or 28 which are each mounted on a bearing portion 29 or 30 of the corresponding roller whose diameter is larger than the intermediate part of the roller, so that each rolling bearing associated with a shaft element is unsupported on two diametrally opposed arcs of 90° corresponding to the other shaft element.

In the embodiment shown in FIG. 9, two shaft elements 31, 32 are also provided for respectively supporting the centre roller B and the edge rollers A and C. The shaft element 31 is in the form of a tube which extends through the edge rollers A and C and has end portions which are carried by supports 22, the shaft element 32 associated with the edge rollers being formed by a solid bar which is coaxial with and inside the tube 31 and has end portions carried by supports 24. As in the embodiment of FIG. 3, the supports 22, 24 of FIG. 9 are supported by the girder 7 through force sensors 6. The centre roller is directly journalled on the tube by means of rolling bearings 28, the edge rollers A and C being each journalled, also by rolling bearings 25, on a tubular sleeve 34 which is outside and coaxial with the tubular element 31 and fixed on the inner bar 32 by means of screws 36 which are screwed in corresponding tapped sleeves 37 which extend through openings 35 of the lateral wall of the tube 31 with clearance.

In the embodiment shown in FIG. 10, the three rollers A, B and C are carried by a single shaft 38 whose end portions are journalled in rolling bearings 39 which are mounted to float vertically in two boxes 40, which bear on the girder 7 placed between the columns 8 of the rolling mill, under the effect of opposing actions of a lower spring 41 and an upper pneumatic jack 42 which may be replaced, if desired, by a second spring. Each roller A, B and C is applied against a subjacent roller 4 which is journalled in rolling bearings 43 each of which is supported by the girder 7 through a force sensor 6.

The diameter of the common shaft 38 must be sufficient to avoid any large deflection under the effect of the load applied by the sheet, but the shaft must be capable of very slightly bending so as to transmit this force to the corresponding support rollers.

In the embodiment shown in FIG. 11, each roller A, B and C is carried by an independent shaft 46 whose end portions are journalled in a rolling bearing 47 which is part of a bearing 48, 49, 51 which bears on the support girder 7 through a force sensor 6. In order to ensure that the clearance between the adjacent faces 52, 53 of the rollers A and B or B and C is minimum and that the sheet D is supported practically in a continuous manner throughout its width, the bearings 49 and 50 (FIGS. 12 and 13) have a special construction. Each one thereof comprises a mount 149 or 151 to which there is welded by its end face the outer ring of the rolling bearing on only a faction of its height. The two mounts 149, 151 fit one inside the other, owing to the fact that the mount 149, which is in the shape of a cradle, is inserted within the opening of the mount 151 which forms a bridge whose upper part supports the outer ring of the corresponding rolling bearing 54.

As can be seen in FIG. 11, the two rolling bearings are inserted within the ends of the rollers A and B or B and C.

It will be observed that only the embodiment of FIG. 11 comprising three independent shafts for the respective rollers permits a strict measurement of the tension exerted in each fraction of the width of the sheet. Indeed:

In the case of FIGS. 3 and 9, although the total load applied to the two lateral or edge rollers A and C may be measured, the load applied to each of these rollers is not known with precision since the load applied to a single of these rollers is partly transmitted to the opposite sensor;

in the case of FIG. 10, as the shaft 38 common to the three rollers has a certain rigidity, the values measured by each pair of sensors 6 will not be exact representation of the load corresponding to this part of the sheet since the load applied to one of the rollers will be partly transmitted to the nearest sensor which is not concerned.

In any case, the lack of precision in the measurements is mostly sufficiently small to avoid adversely affecting the correct operation of the device.

Assuming that the display or read-out 18 (FIG. 2) is the sole result of the use of the measurements of the different sensors 6 and thus furnishes indications to the operator to enable him to correct the possible deviations ascertained, these indications could be given in accordance with either of the following arrangements:

By three indicators having a central zero, namely one for each region. When the tensions are correct in the three regions, the three needles indicate zero. In the event of variation, the needle moves to the left or to the right according as the measured value is lower than or higher than the theoretical value. This arrangement pre-supposes that the sheet is perfectly centered on the axis of the rolling mill.

By two indicators having a central zero, the first being for the central region and the second for the lateral regions. The sum of the tensions of the two lateral regions conserves in this case its indicating value, even if the sheet is not perfectly on the axis of the rolling mill. The operator then only has at his disposal two indications: "central region long" or "edge regions long" (the left, the right, or both).

By a single indicator having a central zero. When the distribution of the tensions between the central region and the two edge regions is in conformity with the theoretical distribution, the needle indicates zero. Deflection to the left or to the right indicates then in the conventional manner a long central region or long edge regions.

The magnitude representing the deflection of the needle, or of each needle, from the central zero in the three foregoing cases, may be for example:

the difference as an absolute value between the measured tension and the theoretical tension;

the difference between the measured tension and the theoretical tension of each region relative to the total measured tension;

the magnitude of the action required for bringing the tension back to the theoretical value.

The indications may of course be furnished in the form of numbers.

In the foregoing description, the sheet D is raised and has its lower face extending partly around the rollers A, B and C. It will be understood that it is possible to adopt the opposite arrangement in which the sheet is lowered and made to partly surround the rollers by its upper face, the other elements of the device being modified in consequence.

The number of rollers may be greater than three, for example five.

Having now described our invention, what we claim as new and desire to secure by Letters Patent is:

1. A process for controlling the flatness of a moving metal sheet subjected to a cold-rolling operation, comprising measuring tensions in different regions of the width of the sheet by means of coaxial substantially adjoining rollers which engage the sheet and extend transversely of the direction of movement of the sheet, said regions being at least three in number with a corresponding number of said rollers, calculating the sum of the tensions measured in the respective regions by said rollers, calculating from the result obtained the theoretical tension in each region by taking into account an axial extent to which the sheet engages each roller so that said theoretical tension corresponds to a tension uniformly distributed along the width of the sheet, comparing said theoretical tension with the tension effectively measured in each region and exerting, if required, correcting actions on the sheet as a function of the results of said comparison.

2. A device for controlling the flatness of a metal sheet travelling under tension in a plane in a cold-rolling mill by measurement of tensions in different regions of the width of the sheet, comprising coaxial thrust rollers which are disposed transversely of the direction of travel of the sheet and positioned to deflect the sheet away from said plane, force measuring means associated with said rollers for measuring forces exerted in a direction substantially perpendicular to said plane by the sheet on each of said rollers, and calculating means connected to the measuring means for calculating the sum of the forces exerted on the rollers, said rollers being at least three in number and being in substantially adjoining relation to each other so that the sum of the forces measured by the measuring means is substantially representative of the total tension exerted on the sheet.

3. A device for controlling in a cold-rolling mill the flatness of a metal sheet by measurement of the tensions in different regions of the width of the sheet, comprising three coaxial thrust rollers which comprise a centre roller and two lateral rollers and are disposed transversely of the direction of travel of the sheet for measuring said tensions in said different regions and force measuring means associated with said rollers for measuring the forces exerted by the sheet on each of said rollers, said rollers being in substantially adjoining relation to each other so that the sum of the forces measured by the respective rollers is substantially representative of the total tension exerted on the sheet, a shaft element which extends through the lateral rollers and has two end portions which extend beyond the lateral rollers, two supports respectively supporting the two end portions beyond the lateral rollers, a girder rigid with a frame of the rolling mill and a force sensor interposed between each support and the girder, the supports bearing on the girder through the respective force sensors.

4. A device as claimed in claim 3, comprising a second shaft element on which the lateral rollers are rotatably mounted and which extends through the supports of the centre roller and has respective end portions extending beyond the supports of the centre roller, two second supports respectively supporting said end portions which extend beyong the supports of the centre roller and a force sensor interposed between each second support and the girder, the second supports bearing on the girder through the respective force sensors.

5. A device as claimed in claim 4, wherein each shaft element comprises at least two cylindro-prismatic members whose cross-sectional shape is approximately an isosceles trapezium having a part-circular large base and sides adjacent said large base which make an angle of 90° therebetween, one of said members being extended beyond the small base of the trapezium cross-sectional shape in the form of blocks which are spaced along the axis of the corresponding shaft element and are applied against a face of the other member which corresponds to the small base of its trapezium cross-sectional shape, substantially radial screws connecting the blocks of said one member to said other member, the shaft elements being disposed in a cross configuration with respect to each other, the blocks of one of the shaft elements extending through gaps between the blocks of the other shaft element, and, in the region of each support receiving the corresponding end portion of one shaft element, means radially setting back the end portion of the other shaft element so as to provide an independent bearing surface for the respective shaft elements.

6. A device as claimed in claim 5, comprising rolling bearings rotatably mounting each roller on the corresponding shaft element, each of which bearings is mounted on a bearing surface of the corresponding roller whose diameter is larger than an intermediate part of the roller.

7. A device as claimed in claim 4, wherein one of the shaft elements is formed by a tubular member which rotatably supports the roller associated with said one shaft element and a bar which forms the other shaft element extends internally through the tubular member and coaxially thereof, there being fixed on the bar at least one tubular sleeve which is concentric with and outside the tubular member and rotatably supports a roller associated with the other shaft element.

8. A device as claimed in claim 2, comprising a single shaft which carries the three rollers and bearings carried by the girder and in which the single shaft is journalled.

9. A device as claimed in claim 8, comprising three support rollers which are associated with the three rollers carried by the single shaft disposed below and in contact with the respective rollers, bearings in which bearings the support rollers are respectively journalled, and a force sensor interposed between each bearing and the girder, the bearings bearing on the girder through the respective force sensors.

10. A device as claimed in claim 8, comprising bearings which are mounted on the rolling mill to float in the vertical direction and in which the single shaft is journalled.

11. A device as claimed in claim 2, comprising for each thrust roller an independent shaft carrying the thrust roller and two bearings in which the independent shaft is journalled, adjacent bearings supporting an end of the centre roller and an adjacent end of a lateral roller being in imbricated relation to each other so as to reduce to a minimum the space between adjacent end faces of the rollers.

12. A device as claimed in claim 11, wherein each of the adjacent bearings comprises a mount having an inner face, a rolling bearing which is fixed, in a fraction of its height, on the inner face and engaged with the corresponding end of the roller, one of the mounts forming a bridge having an upper part to which upper part the associated rolling bearing is fixed, whereas the other mount forms a cradle which is inserted within the bridge.

13. A device as claimed in any one of the claims 3 to 7, comprising a display which provides for each region indications relating to a possible difference between the forces measured by the sensors and the theoretical values.

14. A device as claimed in any one of the claims 3 to 7, comprising a display providing respectively for the axis and the edges indications relating to a possible difference between the forces measured by the sensors and the theoretical values.

15. A device as claimed in claim 14, wherein the display constitutes means constructed and arranged to directly indicate lack of balance between the axis and the edges.

16. A device as claimed in claim 13, wherein the display comprises means for expressing the possible difference between the forces measured by the sensors and the theoretical values in relative value of the total measured tension.

17. A device as claimed in claim 14, wherein the display comprises means for expressing the possible difference between the forces measured by the sensors and the theoretical values in relative value of the total measured tension.

18. A device as claimed in claim 13, wherein the display includes means for presenting in numerical form the indications relating to a possible difference between the measured forces and the theoretical values.

19. A device as claimed in claim 14, wherein the display includes means for presenting in numerical form the indication relating to a possible difference between the measured forces and the theoretical values.

20. A device as claimed in claim 15, where the display includes means for presenting in numerical form the indications relating to a possible difference between the measured forces and the theoretical values.

21. A device as claimed in claim 16, wherein: the display device includes means for presenting in numerical form the indications relating to a possible difference between the measured forces and the theoretical values.

22. A device for controlling the flatness of a metal sheet travelling under tension in a plane in a cold-rolling mill by measurement of tensions in different regions of the width of the sheet, comprising a series of coaxial thrust rollers which are disposed transversely of the direction of travel of the sheet and positioned to deflect the sheet away from said plane, said rollers including a centre roller and at least one pair of lateral rollers respectively located adjacent opposite ends of the centre roller, the rollers being in axially substantially adjoining relation to each other, a first shaft element, mounting means rotatably mounting the centre roller on the first shaft element, at least one further shaft element coaxial with the first shaft element, mounting means rotatably mounting said at least one pair of lateral rollers on said at least one further shaft element, a clearance being provided between the shaft elements and clearance being provided between one of said mounting means and one of said shaft elements whereby the shaft elements are free to move radially of the axis of the shaft elements, two first supports for respectively supporting opposite ends of the first shaft element, two further supports for respectively supporting opposite ends of said at least one further shaft element, a girder rigid with a frame of the rolling mill and a force sensor interposed between each support and the girder, the supports bearing on the girder through the respective force sensors.

23. A device for controlling the flatness of a metal sheet travelling under tension in a plane in a cold-rolling mill by measurement of tensions in different regions of the width of the sheet, comprising a series of coaxial thrust rollers which are disposed transversely of the direction of travel of the sheet and positioned to deflect the sheet away from said plane, said rollers including a centre roller and at least one pair of lateral rollers respectively located adjacent opposite ends of the centre roller, the rollers being in axially substantially adjoining relation to each other, a hollow outer shaft element and as many inner shaft elements as there are pairs of lateral rollers located adjacent opposite ends of the centre roller, means rotatably mounting the centre roller on the outer shaft element, means rotatably mounting the at least one pair of lateral rollers on the respective inner shaft element, said means rotatably mounting the at least one pair of lateral rollers on the respective inner shaft element freely extending through apertures in the outer first shaft element, the inner shaft element pertaining to outermost rollers of said series of rollers being of the smallest cross-sectional size whereas the outer shaft element is of the largest cross-sectional size, clearance being provided between the shaft elements to allow freedom of radial movement of each shaft element, two first supports for respectively supporting opposite ends of the outer shaft element, two second supports for respectively supporting opposite ends of the inner shaft element pertaining to said at least one pair of lateral rollers, the supports pertaining to said outer shaft element being nearer to the centre roller than the supports pertaining to the innermost shaft elements, a girder rigid with a frame of the rolling mill and a force sensor interposed between each support and the girder, the supports bearing on the girder through the respective force sensors.

* * * * *